US011451004B2

United States Patent
McIntyre et al.

(10) Patent No.: US 11,451,004 B2
(45) Date of Patent: Sep. 20, 2022

(54) DOWNHOLE LASER SYSTEM WITH AN IMPROVED LASER OUTPUT PRODUCTION AND DATA COLLECTION

(71) Applicant: United States Department of Energy, Washington, DC (US)

(72) Inventors: Dustin McIntyre, Washington, PA (US); Daniel Hartzler, Westover, WV (US)

(73) Assignee: U.S. Department of Energy, Washington, DC (US)

( * ) Notice: Subject to any disclaimer, the term of this patent is extended or adjusted under 35 U.S.C. 154(b) by 23 days.

(21) Appl. No.: 17/074,162

(22) Filed: Oct. 19, 2020

(65) Prior Publication Data

US 2021/0119403 A1 Apr. 22, 2021

Related U.S. Application Data

(60) Provisional application No. 62/916,508, filed on Oct. 17, 2019.

(51) Int. Cl.

*G01J 3/46* (2006.01)
*H01S 3/106* (2006.01)
*H01S 3/094* (2006.01)
*H01S 3/11* (2006.01)
*G01N 21/31* (2006.01)

(52) U.S. Cl.

CPC ............. *H01S 3/106* (2013.01); *G01N 21/31* (2013.01); *H01S 3/094038* (2013.01); *H01S 3/094053* (2013.01); *H01S 3/094096* (2013.01); *H01S 3/11* (2013.01); *G01N 2201/0633* (2013.01); *G01N 2201/0634* (2013.01); *G01N 2201/0636* (2013.01); *G01N 2201/06113* (2013.01); *G01N 2201/08* (2013.01)

(58) Field of Classification Search

CPC ............... H01S 3/106; H01S 3/094038; H01S 3/094053; H01S 3/094096; H01S 3/11; H01S 3/1024; H01S 3/113; G01N 21/31; G01N 2201/06113; G01N 2201/0633; G01N 2201/0634; G01N 2201/0636; G01N 2201/08; G01N 21/718; G01N 2021/1793; G01J 3/0208; G01J 3/021; G01J 3/0218; G01J 3/443

USPC .......................................................... 356/402

See application file for complete search history.

(56) References Cited

U.S. PATENT DOCUMENTS 10,145,737 B1 * 12/2018 McIntyre .............. H01S 3/0941
2019/0386449 A1 * 12/2019 McIntyre .......... H01S 3/094038

* cited by examiner

*Primary Examiner* — Md M Rahman
(74) *Attorney, Agent, or Firm* — Timothy L. Harney; Michael J. Dobbs; Brian J. Lally

(57) ABSTRACT

One or more embodiments relates to a method of growing ultrasmooth and high quantum efficiency CsTe photocathodes. The method includes exposing a substrate of Cs using an alkali source such as an effusion cell; and controlling co-evaporating growth and co-deposition forming a CsTe growth. The method further includes monitoring a stoichiometry of the CsTe growth.

6 Claims, 5 Drawing Sheets

DOWNHOLE LASER SYSTEM WITH AN IMPROVED LASER OUTPUT PRODUCTION AND DATA COLLECTION

CROSS-REFERENCE TO RELATED APPLICATIONS

This application claims the benefit of and priority to U.S. Provisional Application 62/916,508 filed Oct. 17, 2019 titled DOWNHOLE LASER SYSTEM WITH AN IMPROVED LASER OUTPUT PRODUCTION AND DATA COLLECTION, which is incorporated herein by reference in its entirety.

STATEMENT OF GOVERNMENT SUPPORT

The United States Government has rights in this invention pursuant to the employer-employee relationship of the Government to the inventors as U.S. Department of Energy employees and site-support contractors at the National Energy Technology Laboratory.

FIELD OF THE INVENTION

Embodiments consistent with the present disclosure relates to a system and method for laser induced breakdown spectroscopy applications.

BACKGROUND

The low-cost, efficient monitoring of remote locations has and continues to be highly sought in the industry. For example, when drilling a production or injection well for oil/gas production or CO2 storage it is always helpful to know the location of the drill head in terms of geometry and in terms of stratigraphy. Geologic strata may vary significantly over both a basin and production field scale due to variations in depositional terrain in the past or more recent geologic activity. As the drill may be under tremendous pressure and temperatures in extreme environments, it is difficult to monitor conditions during drilling or even with the drill still in the well bore. Therefore, drilling operations are often suspended, and the drill removed, in order to examine the well bore.

Efforts have been made to use lasers for remote monitoring. Generally, a high-power lasing power is produced at a local location and sent to a remote location via an optical fiber. In these systems, optical fibers limit the peak power of the lasing power transferred. These systems pose a serious risk to users in the area if an optical fiber is damaged, resulting in dangerous lasing power emissions in the area. Other remote monitoring technologies generate lasing power at the remote location, requiring complex electronics at the remote location. An optical response is detected and analyzed directly at the remote location. However, these systems are prone to fluctuations in output and measurements due to changing pressures and temperatures at the remote location, particularly in extreme environments, for example down hole drilling.

Current diode pumped solid state (DPSS) laser systems, generally designated 10, used for laser induced breakdown spectroscopy applications in fluid (water) system measurements as depicted in FIG. 1 (see U.S. Pat. No. 8,786,840, the entirety of which is incorporated by reference herein). System 10 includes fiber 12 which produces light 14 with is incident on lens 16, passing therethrough and then is incident on mirror 18. A portion of the light than strikes laser 22, which includes HR 24, LS 26, QSW 28, and OC 30. The light produced by the laser 22 strikes mirror 32, hits lens 34 and produces spark 36.

System 10 has numerous limitations. First, the system 10 is susceptible to dimensional changes caused by temperature and pressure swings in fluctuating environments such as downhole applications. Another issue is the ability to control the output pulse energy of the laser pulses. DPSS solid state passively Q-switched systems are "set and forget" systems designed for one input and output level. A second issue is the shape of the laser spark produced in the fluid for measurements. The systems deliver a small diameter laser beam (relative to the optical aperture) and focus this beam into the water. The spark that is produced is very long and filamentary in nature. The issue that arises is that the only part of the spark that can be used for analysis is the backward facing cross section for a confocal light collection system. The light from the spark is internally absorbed by the spark and not able to be used as well as the downstream portion of the spark which is hidden from the collection optics. The third issue is the collection and transmission of the plasma emission for analysis. The light can be immediately inserted into a secondary fiber but if the optical designer wants to deliver the emission back up the singular fiber that delivers the pump energy then the light must be transmitted a short distance. The emitted light has a degree of divergence that will prevent the designer from collecting it all into the original fiber.

Accordingly, it is an object of this disclosure to provide a system incorporating three optical features to address the issues described above. First, a lens arrangement for beam overlap control provides control of output pulse characteristics. The beam overlap control allows for dictating laser output beam size and energy content, allows for control of the laser output, and reduces system temperature and pressure sensitivity. Second, a beam expansion control (a beam expander) provides control for characteristics of the laser spark. The beam expansion control provides efficient use of pulse energy, lowering energy requirements for pulsed laser and provides for a "hotter," more compact spark. Third, spectral emission control or divergence control controls divergence and thus lost light of collected spectral emission. The spectral emission control reduces the size of spark image on the fiber face, reducing alignment sensitivity and coupling more light into the fiber in the data collection system. These and other objects, aspects, and advantages of the present disclosure will become better understood with reference to the accompanying description and claims.

SUMMARY

One embodiment relates to a system and method for laser induced breakdown spectroscopy (LIBS) applications. In one embodiment of the system, the system is a device for a remote sensor using a low peak power optical pump. The system comprises an optical pumping source optically connected to an optical fiber; a first lens; a first mirror; an adjustable focus lens arrangement comprising two lenses where one lens is able to move relative to the second lens to provide an adjustable focus; a passively q-switched laser; a beam expander comprising at least a first lens and second lens; a second mirror; a third lens; a third mirror positioned whereby at least some optical response from a sample area is reflected to the third mirror, and where the third mirror is optically connected to both the second mirror and through a spectral emission control to a fourth mirror; the fourth mirror is optically connected to the first mirror to reflect at least some optical response from the sample area, reflected by the second mirror, the third mirror through the spectral emission control, and the fourth mirror, towards the first lens, which is optically connected first optical fiber.

One or more embodiments relates to a system for remote optical detection. The system includes an optical pumping source optically connected to an optical fiber; an adjustable focus lens arrangement optically connected to at least one of the optical pumping source and the optical fiber; and a passively q-switched laser optically connected to the adjustable focus arrangement. The system further includes a beam expander optically connected to the passively q-switched laser; a sample area optically connected to at least the beam expander; and a spectral emission control optically connected to at least one of the optical fiber and the optical pumping source.

Another embodiment relates to a system for remote optical detection. The system includes an optical pumping source optically connected to an optical fiber; a first lens optically connected to the optical pumping source and optical fiber; a first mirror optically connected to the first lens; an adjustable focus lens arrangement optically connected to the first mirror; and a passively q-switched laser optically connected to the adjustable focus lens. The system further includes a beam expander optically connected to the passively q-switched laser; a second mirror optically connected to the beam expander; a second lens optically connected to the second mirror; a third mirror positioned whereby at least some optical response from a sample area is reflected to the third mirror and where the third mirror is optically connected to both the second mirror and a fourth mirror; and a spectral emission control optically connected to the first mirror to reflect at least some optical response from the sample area, reflected by the second mirror to the third mirror, through the spectral emission control and the fourth mirror and towards the first lens, which is optically connected to the optical fiber.

Yet another embodiment relates to a method for remote detection. The method includes producing a plurality of pumping energy pulses at a first location, each of the pumping pulses having substantially the same power and duration; and expanding each of the produced pumping energy pulses through an adjustable focus lens arrangement to laser media at a second location, thereby producing a lasing pulse after the laser media absorbs one or more of said pumping pulses. The method further includes directing the lasing pulse through a beam expander to a sample, the sample producing an optical response after receiving the directed lasing pulse; directing the optical response through a spectral emission control to one or more optical response analyses; and analyzing the directed optical response.

Still another embodiment relates to a method for remote detection. The method includes producing a plurality of pumping energy pulses at a first location, each the pumping pulses having substantially the same power and duration; focusing the pumping pulses, forming the focused pumping pulses; absorbing one or more of the focused pumping pulses at a laser media, forming lasing pulses; and expanding the lasing pulses, forming expanded lasing pulses. The method further includes directing the expanded lasing pulses to a sample, producing one or more optical pulses; controlling the spectral emission of the one or more optical response, controlling one or more optical response; and, analyzing the one or more optical response.

BRIEF DESCRIPTION OF THE DRAWINGS

The invention together with the above and other objects and advantages will be best understood from the following detailed description of the preferred embodiment of the invention shown in the accompanying drawings, wherein.

DETAILED DESCRIPTION

The foregoing summary, as well as the following detailed description of certain embodiments of the present invention, will be better understood when read in conjunction with the appended drawings.

The following detailed description should be read with reference to the drawings in which similar elements in different drawings are numbered the same. The drawings, which are not necessarily to scale, depict illustrative embodiments and are not intended to limit the scope of the invention.

One or more embodiments relates to

Figure 2:
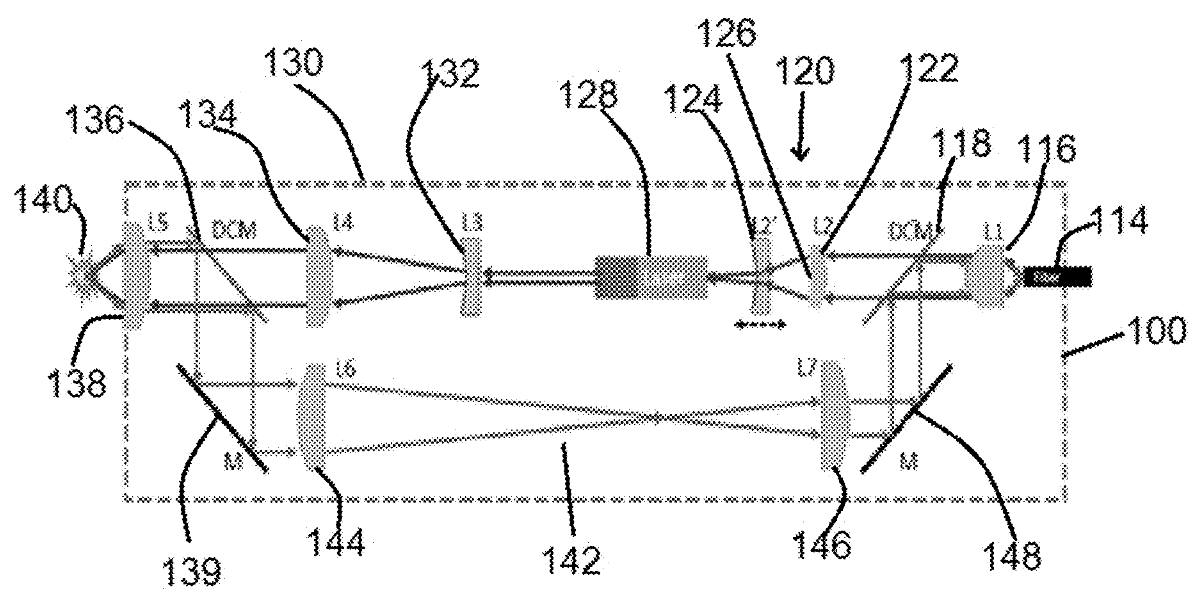
FIG. 2 depicts an embodiment of a LIBS system featuring beam overlap control, beam expansion control, and spectral emission control.

In one embodiment depicted in FIG. 2, a system for remote sensing, generally designated 100, using a low peak power optical pump is illustrated. The system 100 includes an optical fiber 114 optically connected to an optical pumping source (not shown). In at least one embodiment, the optical fiber 112 delivers light from the optical pumping source (a diode pump source located away from the system 100) to the system 100. This enables delivering light to the system 100 and the return of spectral emission from the system 100 to remote analysis equipment.

a first lens 116 optically connected to the optical fiber 114; a first mirror 118 (a dispersion compensating mirror (DCM) for example) optically connected to the first lens 116; an adjustable focus lens arrangement (or alternatively a beam expander) 120 optically connected to the first mirror 118. The adjustable focus lens arrangement 120 comprises two lenses, a first focus lens 122 and a second focus lens 124, where the first focus lens 122 moves relative to the second focus lens 124, providing an adjustable focus. In at least one embodiment the first focus lens 122 has a surface 126 defining a first plane, such that the second focus lens 124 moves along a second plane generally orthogonal to the first plane.

System 100 includes a passively q-switched laser 128 optically connected to the adjustable focus lens arrangement 120 and a beam expander 130 optically connected to the passively q-switched laser 128. In one embodiment, the beam expander 130 comprises at least a first beam expander lens 132 and second beam expander lens 134. The system 100 further includes a second mirror 136 (a second DCM for example) optically connected to the beam expander 130; a third lens 138 optically connected to the second mirror 136; a third mirror 139 optically positioned whereby at least some optical response from a sample area 140 is reflected to the third mirror 139, whereby the third mirror 139 is optically connected to both the second mirror 136 and a fourth mirror 148.

The system 100 further includes a spectral emission control 142 comprising a first spectral emission lens 144 and a second spectral emissions lens 146, where the fourth mirror 148 is optically connected to the first mirror 118 to reflect at least some optical response from the sample area 140, reflected by the second mirror 136, to the third mirror 139, through the spectral emission control 142, and the fourth mirror 148, towards the first lens 116, which is optically connected to the first optical fiber 114. This enables the return of spectral emission from the system 100 to remote analysis equipment The embodiment illustrated in FIG. 2 includes at least three features that work together to improve the overall operation and flexibility of system 100 such as downhole LIBS sensors used in such applications as fluid measurements. The ability to control the pumped volume inside the laser crystal provides control over the output pulse characteristics that are currently not available in known passively Q-switched laser systems. By producing a larger pumped volume, the output of the subject laser may be a larger diameter, with less or equivalent photon density, allowing for larger laser pulse energy. To accomplish this, first focus lens 122 and a second focus lens 124 act together as an adjustable focus lens or beam expander arrangement with the second focus lens 124 able to move with respect to first focus lens 122. This movement of lens 124 changes the diameter of the pump laser beam as it enters the passively Q-switched laser 128 thereby enabling increasing or decreasing the pumped output beam size and pulse energy passively Q-switched laser 128. Another effect of such movement enables changing or adjusting the beam convergence angle.

The beam expander 130 on the downstream side of the passively Q-switched laser 128 enables changing the laser output beam, increasing the diameter for example. This increase in laser beam diameter enables using a final lens with a much tighter focus or shorter focal length for example. This produces a more spherical shaped plasma that improves the overall performance of the system 100 as opposed to using a smaller beam diameter and a longer focal length final lens that produces a more cigar shaped plasma with a smaller cross sectional area than the spherical plasma. In this way the laser energy of the present invention is used to make a longer thinner plasma such that only one end of the 'cigar' is seen. More energy is needed to make this cigar shaped plasma which is smaller in cross section than the more spherical shaped plasma (from the new method). Therefore the new method requires less energy to make a plasma that appears larger and produces more light for analysis.

Furthermore, the introduction of the beam expander 130 downstream of the passively Q-switched laser 128 produces a more symmetric laser spark that provides more light for analysis and lower losses during spark production. This enables using lower energy output pulses than previously known. The addition of spectral emission control/divergence control optics 142 to the data collection system greatly enhances the amount of light that is returned to the spectrometer for analysis.

Figure 1:
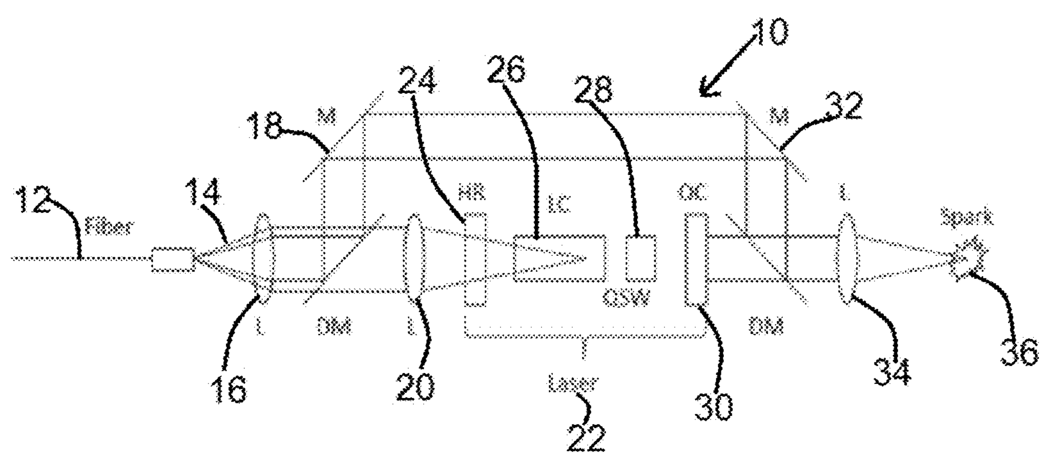
FIG. 1 a LIBS system according to the prior art.
Figure 3:
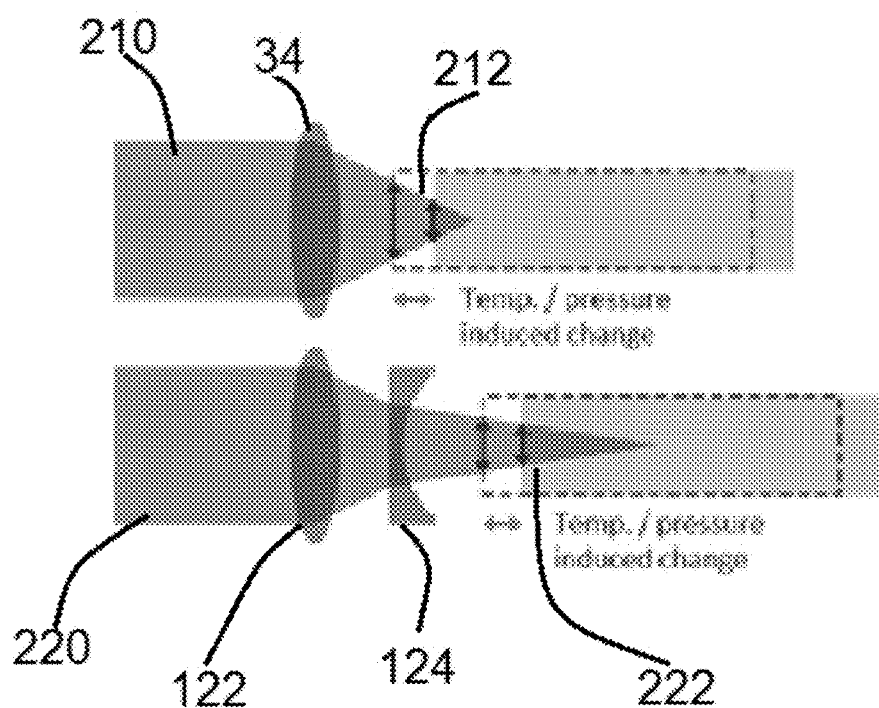
FIG. 3 depicts two laser pulses produced using systems illustrated in FIG. 1 and FIG. 2.
Figure 4:
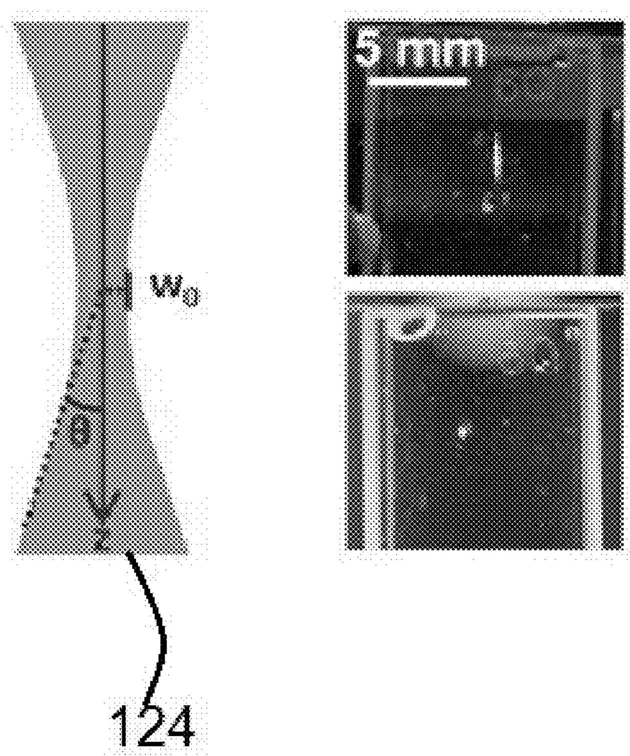
FIG. 4 depicts control of the divergence for the laser pulse of FIG. 3.

It should be appreciated that one or more embodiments of the system 100 provides pump volume and/or cross section control that enables controllable variation in the laser output pulse, the modification of the output beam size and subsequent tight focusing will allow for more light collection with a smaller initial laser pulse for spark production. FIG. 3 depicts two laser output pulses 212 and 222 produced using system 10 illustrated in FIG. 1 and system 100 illustrated in FIG. 2. FIG. 3 depicts input laser pulse 210 impinging a lens (lens 34 of system 10 illustrated in FIG. 1 for example) and laser output pulse 212 having a first beam size and first light focusing. FIG. 3 illustrates the laser pulse 220 and laser output pulse 222 and the addition of second lens to a first lens (second focus lens 124 and first focus lens 122 of system 100 for example) which reduce the system's sensitivity to thermal expansion because the first focus lens 122 tightly focuses the pump into the laser meaning it has a large convergence angle. Adding the second focus lens 124 enables reducing the convergence angle making small changes (See FIG. 4) in the distance between second focus lens 124 and the laser result in changes to the pump beam diameter.

Figure 5A:
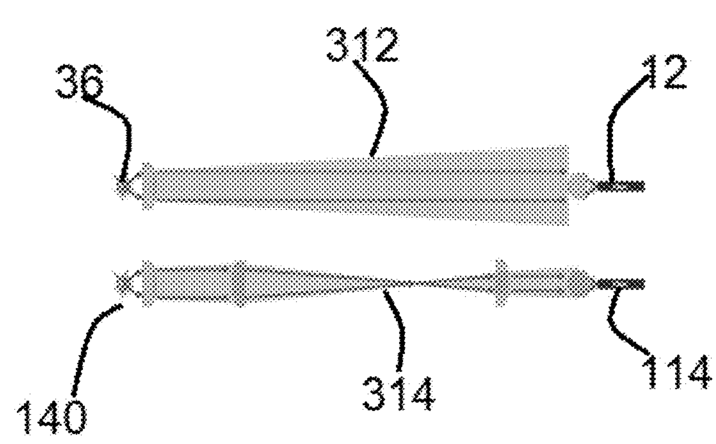
FIGS. 5A-5B illustrate side views of the fiber output (FIG. 5A) and end views of the fiber output (FIG. 5B)
Figure 5B:
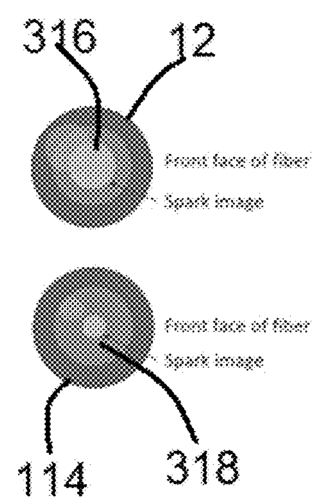

FIGS. 5A-5B illustrate side views of the fiber output 312 and 314 of fibers 12 and 114 respectively (FIG. 5A) and end views of the fiber output 316 and 318 (FIG. 5B) FIGS. 5A and 5B demonstrate that the control of the divergence for the light to be analyzed provides more light to analyze as less is lost to divergence. This demonstrates that the spot size of the returning light is smaller and more controllable over a broad range of wavelengths. The design illustrated in FIG. 1 reduces spark image by ~40%, while the present design illustrated in FIG. 2 reduces spark image by ~70%. Finally, the addition of second focus lens 124 reduces the system's 100 sensitivity to thermal expansion because currently the first focus lens 122 is tightly focuses the pump into the laser meaning it has a large convergence angle. Adding the second focus lens 124 enables reducing the convergence angle making small changes in the distance between second focus lens 124 and the laser only result in changes to the pump beam diameter. (See FIG. 3).

An exemplary method for remote detection as with the system 100 of FIG. 2 includes producing a plurality of pumping energy pulses at a first location, each of the pumping pulses having substantially the same power and duration; and expanding each of the produced pumping energy pulses through an adjustable focus lens arrangement to laser media at a second location, thereby producing a lasing pulse after the laser media absorbs one or more of said pumping pulses. The method further includes directing the lasing pulse through a beam expander to a sample, the sample producing an optical response after receiving the directed lasing pulse; directing the optical response through a spectral emission control to one or more optical response analyses; and analyzing the directed optical response.

An exemplary method for remote detection as with the system 100 of FIG. 2 includes producing a plurality of pumping energy pulses at a first location, each the pumping pulses having substantially the same power and duration; focusing the pumping pulses, forming the focused pumping pulses; absorbing one or more of the focused pumping pulses at a laser media, forming lasing pulses; and expanding the lasing pulses, forming expanded lasing pulses. The method further includes directing the expanded lasing pulses to a sample, producing one or more optical pulses; controlling the spectral emission of the one or more optical response, controlling one or more optical response; and, analyzing the one or more optical response.

The system has applications as an ignition source for solids, liquids, and/or gases for remote sensing such as the composition of fluids in downhole applications, as a plasma excitation source for LIBS, for detection of pulsed Raman signals, as well as atomic emission signals. Bulk characteristic measurements possible include total dissolved solids, pH, and conductivity. Chromatography applications include molecular sensing of gases and liquids. Mass Spectrometry applications include atomic sensing. The invention may also be used as a LIBS excitation laser system. This system could also be used for a combination cutting/welding/marking laser system.

Having described the basic concept of the embodiments, it will be apparent to those skilled in the art that the foregoing detailed disclosure is intended to be presented by way of example. Accordingly, these terms should be interpreted as indicating that insubstantial or inconsequential modifications or alterations and various improvements of the subject matter described and claimed are considered to be within the scope of the spirited embodiments as recited in the appended claims. Additionally, the recited order of the elements or sequences, or the use of numbers, letters or other designations therefor, is not intended to limit the claimed processes to any order except as may be specified. All ranges disclosed herein also encompass any and all possible sub-ranges and combinations of sub-ranges thereof. Any listed range is easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as up to, at least, greater than, less than, and the like refer to ranges which are subsequently broken down into sub-ranges as discussed above. As utilized herein, the terms "about," "substantially," and other similar terms are intended to have a broad meaning in conjunction with the common and accepted usage by those having ordinary skill in the art to which the subject matter of this disclosure pertains. As utilized herein, the term "approximately equal to" shall carry the meaning of being within 15, 10, 5, 4, 3, 2, or 1 percent of the subject measurement, item, unit, or concentration, with preference given to the percent variance. It should be understood by those of skill in the art who review this disclosure that these terms are intended to allow a description of certain features described and claimed without restricting the scope of these features to the exact numerical ranges provided. Accordingly, the embodiments are limited only by the following claims and equivalents thereto. All publications and patent documents cited in this application are incorporated by reference in their entirety for all purposes to the same extent as if each individual publication or patent document were so individually denoted.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

One skilled in the art will also readily recognize that where members are grouped together in a common manner, such as in a Markush group, the present invention encompasses not only the entire group listed as a whole, but each member of the group individually and all possible subgroups of the main group. Accordingly, for all purposes, the present invention encompasses not only the main group, but also the main group absent one or more of the group members. The present invention also envisages the explicit exclusion of one or more of any of the group members in the claimed invention.

What is claimed is:

1. A system for remote optical detection comprising:

an optical pumping source optically connected to an optical fiber;

a first lens optically connected to the optical pumping source and optical fiber;

a first mirror optically connected to the first lens;

an adjustable focus lens arrangement optically connected to the first mirror;

a passively q-switched laser optically connected to the adjustable focus lens;

a beam expander optically connected to the passively q-switched laser;

a second mirror optically connected to the beam expander;

a second lens optically connected to the second mirror;

a third mirror positioned whereby at least some optical response from a sample area is reflected to the third mirror and where the third mirror is optically connected to both the second mirror and a fourth mirror; and a spectral emission control optically connected to the second mirror to reflect at least some optical response from the sample area, reflected by the second mirror to the third mirror, through the spectral emission control and to the fourth mirror and towards the first lens, which is optically connected to the optical fiber.

2. The system of claim 1 where the adjustable focus lens arrangement comprises two lenses a first focus lens and a second focus lens spaced from and able to move relative to the first focus lens, providing an adjustable focus.

3. The system of claim 2 wherein the first focus lens has a surface defining a first plane and further wherein the second focus lens moves on a second plane orthogonal to the first plane.

4. The system of claim 1 where the beam expander comprising a first expander lens and a second expander lens.

5. The system of claim 1 where the spectral emission control comprises a first spectral emission control lens and a second spectral emission control lens.

6. The system of claim 1 where the first and second mirrors comprise dispersion compensating mirrors (DCMs).

* * * * *